PROGRAMMED MACHINE-TOOL SYSTEM

Filed April 20, 1960 6 Sheets-Sheet 4

March 23, 1965 K. A. KAROW 3,175,188

PROGRAMMED MACHINE-TOOL SYSTEM

Filed April 20, 1960 6 Sheets-Sheet 6

United States Patent Office 3,175,188

Patented Mar. 23, 1965

3,175,188
PROGRAMMED MACHINE-TOOL SYSTEM

Kenneth A. Karow, Chicago, Ill., assignor to International Telephone and Telegraph Corporation, New York, N.Y., a corporation of Maryland Filed Apr. 20, 1960, Ser. No. 23,426
3 Claims. (Cl. 340—147)

This invention relates in general to a programmed machine-tool system and in particular to systems of the above character wherein machine-tool instruction date is stored on crossbar-switch registers before transmission to the machine being controlled. Its principal object is to provide new and improved control circuits for simply and reliably controlling the crossbar-switch registers.

Heretofore, registers used in programmed machine-tool systems employed mechanical stepping-switch registers. Stepping-switch registers permitted relatively simple control circuits since the register stores were readily adaptable to decimal storage, the type of storage commonly employed. However, these types of registers were unsatisfactory since undesirable microphonic interference was continually present. Additionally, the mechanical wiping switches had a short life and needed to be replaced frequently.

The foregoing disadvantages were overcome by prior art arrangements utilizing crossbar switches as registers in place of the noted stepping switches. However, these crossbar switches required complex and expensive control circuitry to properly control the registers at the speed required for suitable machine-tool operation.

According to the present invention, simple and reliable control circuitry is provided for operating the crossbar switches at a speed substantially greater than provided in known mechanical storage systems. This is accomplished by utilizing dual registers in which instruction data is fed to one register while the other register is being interrogated for previously recorded instruction to be transmitted to the machine being controlled.

A related feature of the invention resides in a circuit arrangement for further increasing the speed of recording operations over and above that provided by the dual storage arrangement. More specifically, in dual registers, the speed of system operation can be increased by excluding the repeated recording of instructions whenever two or more identical machine-tool operations are required successively. In order for this noted increase to be effected, the continual switching of registers from storing or read-in operations to read-out operations must be modified in accordance with the varying requirements for utilizing previously recorded data or for utilizing newly added recorded data. This problem is solved by a unique register interrogation and control circuit which releases a portion of the last-used register only after new and different instructions are recorded in the other register. If the same instructions are to be repeated, the previously recorded instructions are retained and read-out again as a part of the next machine instructions.

The above mentioned and other objects and features of the invention, and the manner of obtaining them, will become more apparent, and the invention will be best understood by reference to the following description of the invention taken in conjunction with the accompanying drawings, comprising FIGS. 1 to 6, wherein.

For the best understanding of the invention, FIGS. 1 to 5 should be arranged side-by-side with FIG. 6 placed directly below FIG. 4.

Figure 6:
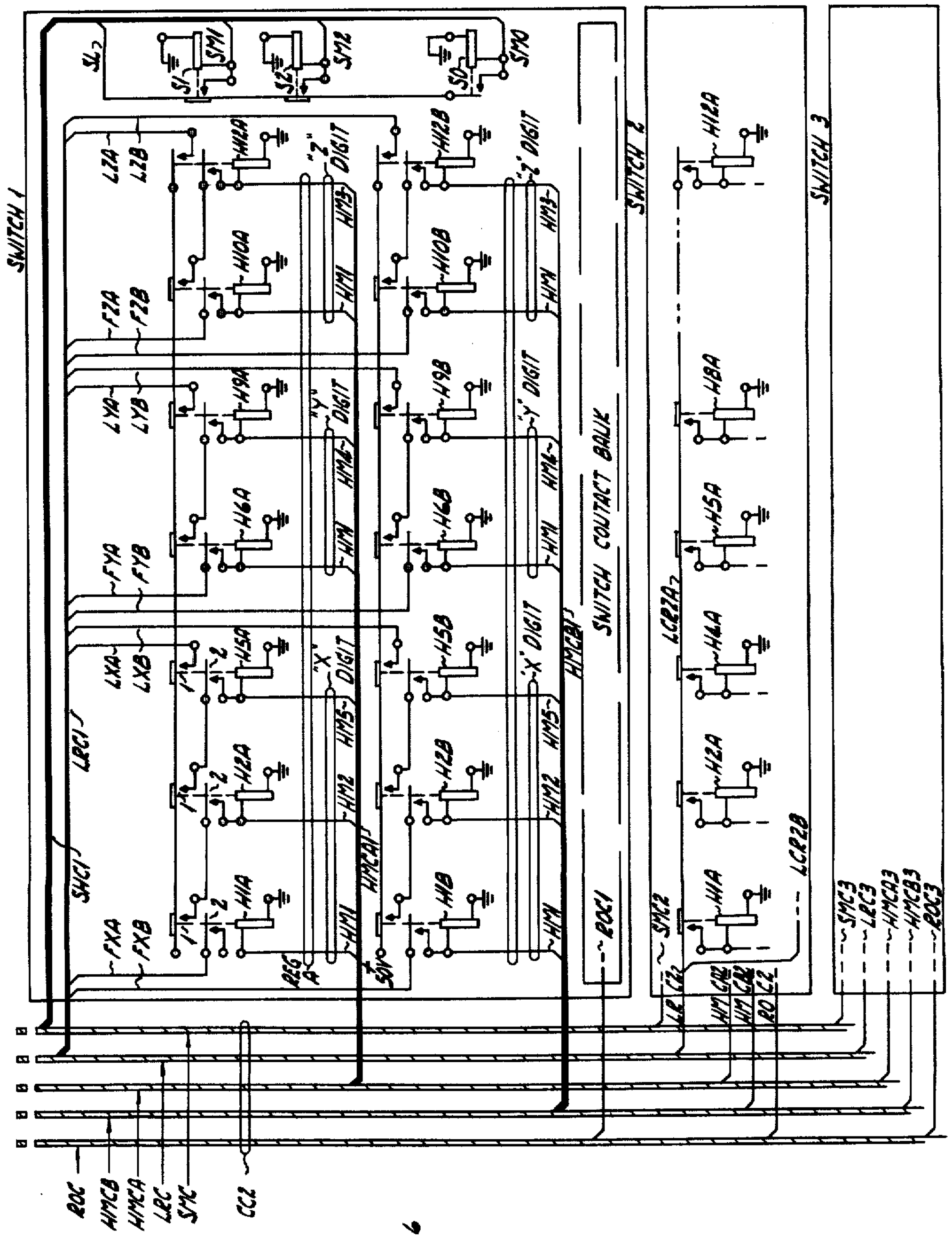
FIG. 6 shows a circuit diagram of portions of the crossbar switches used as registers.

The crossbar switches shown in FIG. 6 may be of the general type disclosed in U.S. Patent No. 2,577,067. Such switches may contain ten horizontal and twenty-five vertical intersecting contact rows. The horizontal rows are controlled by respective select magnets and the vertical rows are controlled by respective hold magnets. As will be described in detail hereinafter, a select magnet is first operated, a hold magnet is then operated and the select magnet thereafter released. The contacts of cross-points at the intersection of the noted horizontal and vertical rows are operated and maintained operated until the concerned hold magnet is subsequently released.

GENERAL DESCRIPTION

Figure 1:
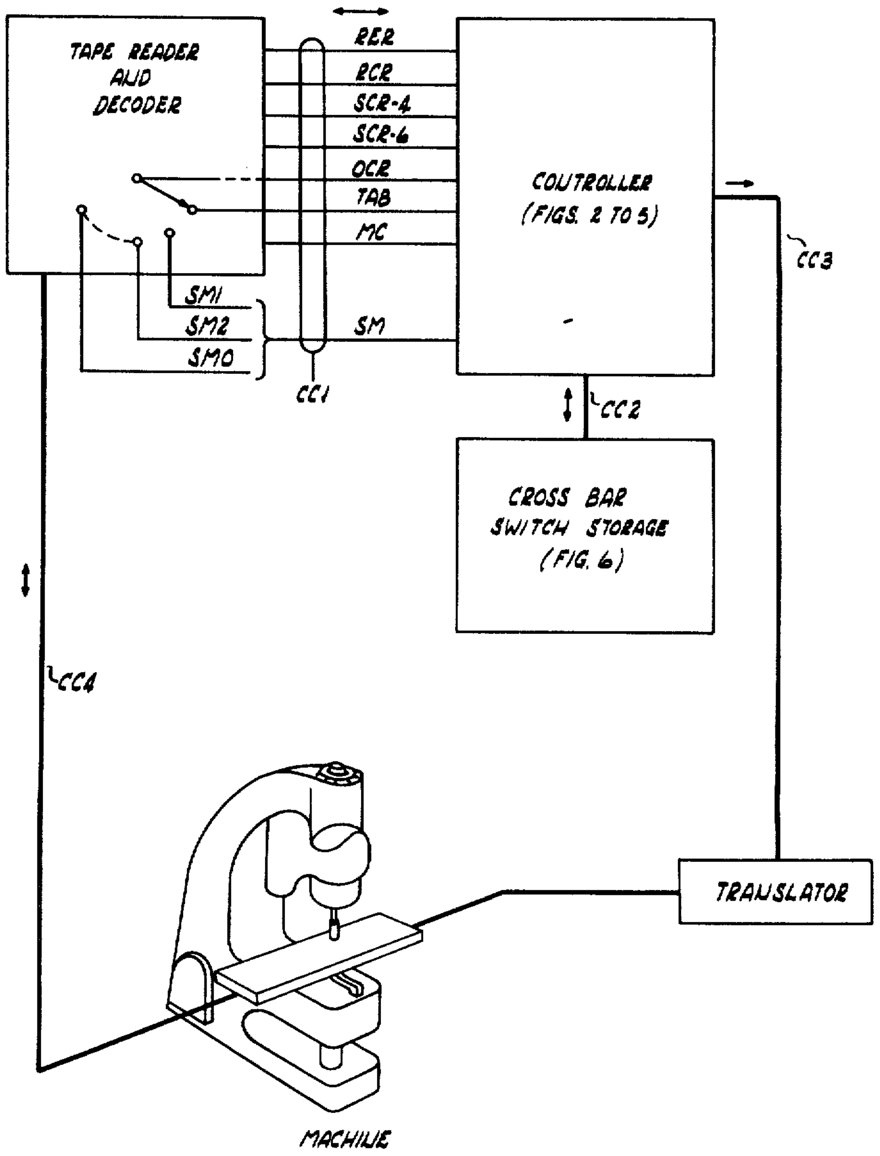
FIG. 1 shows a block diagram of a tape-controlled machine-tool system.
Figure 2:
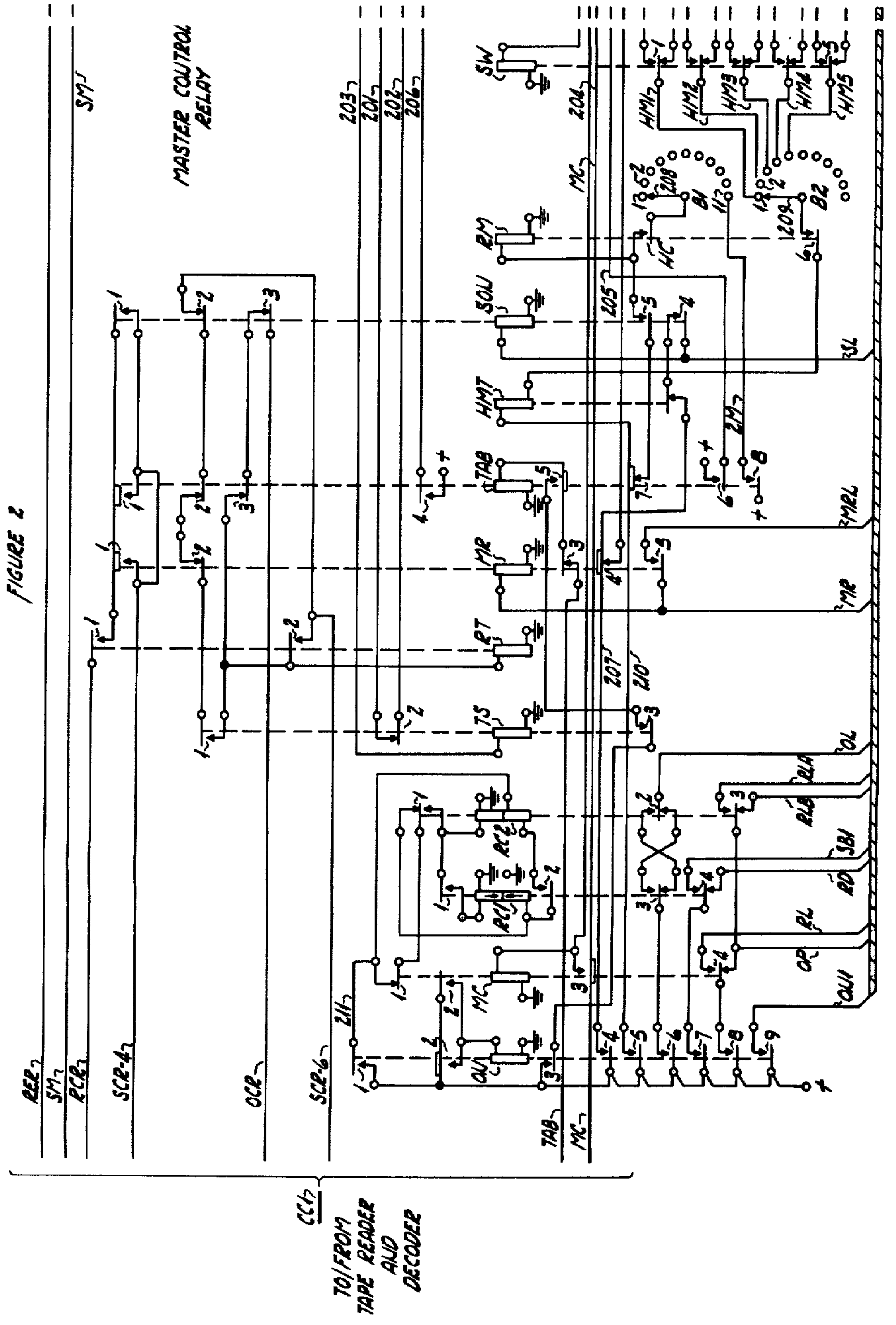
FIG. 2 shows a circuit diagram of the principal control relays which correlate instruction data and signals received from a tape reader with the crossbar switch registers.
Figure 3:
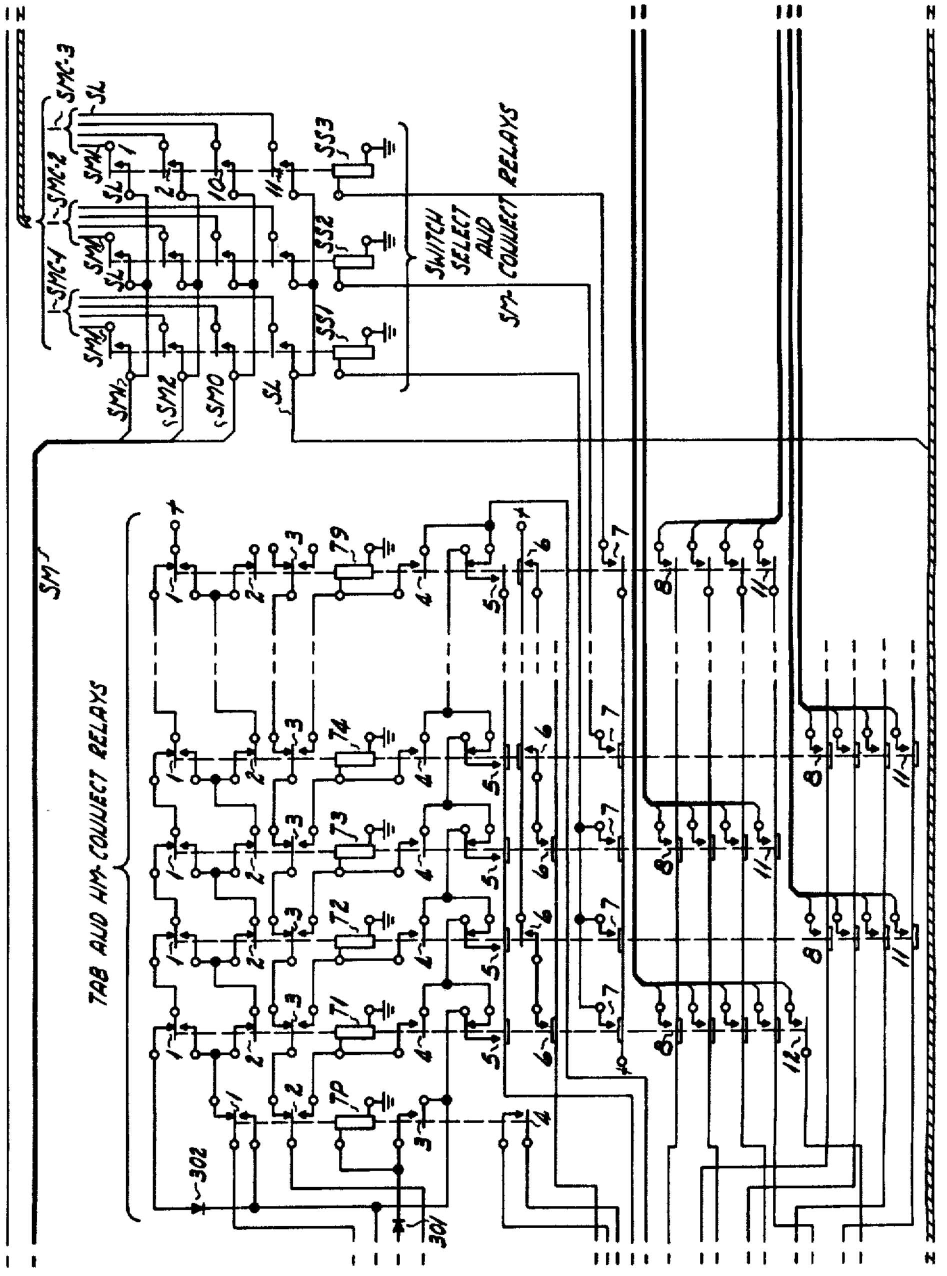
FIG. 3 shows a circuit diagram of hold-magnet and select-magnet connecting relays for operating the crossbar switches.

Referring now to FIG. 1 of the drawings, a general description of the system will be given.

The tape controlled machine-tool system includes a tape reader and decoder which reads a specially prepared perforated or magnetic tape. The tape information is read and translated into control signals and digit instructions which are transmitted over conductors in cable CC1 to the controller. The type of signals and digit instructions and their arrival sequence will be described in detail hereinafter. The tape reader and decoder also exercises direct control over the machine-tool by way of cable CC4 to effect mechanical operations at the machine to condition it for reception of positioning instructions. Such control is not a part of this invention and is not disclosed in detail herein.

The crossbar switch storage comprises two separate registers, each register containing a plurality of individual stores. When one set of instructions is sent to the controller from the tape reader, the various items of control data or instructions are recorded on the corresponding individual stores over conductors in cable CC2. At the same time, previously recorded instructions are read-out of the stores in the other register over corresponding conductors in cables CC2 and CC3; fed to a translating device; and then repeated to the machine tool being controlled. The machine tool responds to the control-data information and also to the direct tape-reader control instructions to carry out machine-tool operations previously programmed by the noted specially prepared tape.

DETAILED OPERATION

Referring now to FIGS. 2 to 6, the detailed operation of the crossbar switch storage and the controlling circuitry will be described.

The physical arrangement of the switches in FIG. 6 will be described first to more clearly show the type of information recorded and the problems solved by applicant's arrangement in recording such information.

In controlling a machine tool, instructions pertaining to the three-dimensional positioning of the tool, spindle and feed speeds, tool changes and numerous other control instructions must be transmitted to the machine. These instructions are recorded in decimal form and are later read-out; translated into suitable machine-tool control signals by the translator apparatus shown as a block diagram to FIG. 1; and then fed to the machine.

Extreme accuracy can be acquired in this manner since a multi-digit instruction may be recorded which controls the machine-tool to positions accurate to ten-thousandths of an inch. More specifically, the tool must be positioned in two directions in a horizontal plane and positioned vertically above such plane. The instructions for such positioning are termed "X" function instructions, "Y" function instructions, and "Z" function instructions for the corresponding co-ordinates of a three-dimensional zone of tool operation. The "X" function instructions may consist of a six-digit number with the first two digits providing positioning signals corresponding to one hundred separate positions covering the distances of 00 units to 99 units. In such case, the last four digits may provide vernier positioning signals providing accuracy up to .0001 unit. The "Y" and "Z" function instructions may be similar or vary according to the accuracy desired.

It has been chosen to disclose the "X" functions as comprising a five-digit number with the decimal point of such number lying between the first two digits. Thus, any "X" function coordinate position from 0.0001 to 9.9999 units can be acquired. It has also been chosen to disclose the "Y" function instructions as comprising a four-digit number and the "Z" function instructions as comprising a three-digit number. This provides "Y" function positioning accuracy from 0.001 to 9.999 units and "Z" function positioning accuracy from 0.01 to 9.99 units. The remaining function instructions, relating to spindle speed, tool changes and auxiliary controls are disclosed as four-digit numbers. For purposes of this disclosure, six distinct control functions, termed functions "A" to "F," are provided in addition to the "X," "Y," and "Z" functions. The identity of such functions are unimportant but they may relate to positioning data for controlling the cutting of circles, the changing of tools and the like as above noted. Accordingly, for each cycle of machine operation, nine different function instructions must be fed to the controller. As will appear hereinafter, certain of these function informations may be similar on two or more successive machine operations.

In tape-controlled machines, it is necessary that the registers contain positioning information at all times concerning the "X," "Y," and "Z" functions. This is required in order that the tool will not be moved erroneously into the stock secured in the machine. This requirement normally is not present in the other six functions since these functions control the starting and stopping operations, rather than causing movement which might interfere with the stock being machined.

Referring now to FIG. 6, three 10-horizontal, 25-vertical crossbar switches are partially disclosed. The first switch is divided into two sections of twelve verticals each with the first five verticals being used for storage of the five-digit "X" function instructions, the next four verticals being used for storage of the four-digit "Y" function instructions and the next three verticals being used for storage of the three-digit "Z" function instructions. Similar vertical assignments are present for the twelve verticals of the second section of the first switch. For purposes of description, the two sections of each switch will be termed "register A" and "register B."

In order to record a digit instruction, the select magnet corresponding to the digit value to be recorded is operated. Thereafter, the hold magnet corresponding to the position of the digit (first, second or last) in any function instruction is operated and the crosspoint at the intersection of the horizontal (select magnet) and the vertical (hold magnet) row is operated. More specifically, if the first digit of the "X" function instructions is the digit "5," the fifth select magnet of switch 1 is operated, followed by the operation of the first hold magnet of the "X" function group or store of such switch. If the digit "5" being recorded is the fifth digit of the "X" function instructions, the fifth hold magnet is operated.

It can thus be seen that for a complete set of instructions for a single three-dimensional positioning, twelve hold magnets may be operated in either register of the first switch and a corresponding number of crosspoints operated therein.

The hold magnets of each register of the second and third switches are grouped into three groups or stores of four magnets each, corresponding to the noted four-digit auxiliary functions "A" to "F."

If the total number of digits for the "X," "Y", and "Z" function informations exceed twelve, an additional switch may be employed. For example, if the "X" function information contains six digits, the "Y" function contains six digits and the "Z" function instruction contains five digits, one complete information storage for one register would require seventeen verticals. In order to provide registers A and B on the same switch, a crossbar switch having 34 verticals would be required. This situation can be adequately handled by registering the first three "X" function instruction digits on hold magnets in one switch and the remaining three "X" function instruction digits on hold magnets in an auxiliary switch. Similarly, the "Y" and "Z" function instruction digits can be recorded on separate switches. This situation will be described hereinafter.

Referring now to FIGS. 2 to 6, a detailed description of the operation of the system will be given.

*Power-on condition*

The power to the machine-tool system is normally off during adjustment of the tool and insertion of stock in the machine. When the power is thereafter turned on, the hereinafter described sequence of operations takes place in conditioning the equipment to receive the positioning and operating instructions.

When the power is first turned on, an operating circuit is completed for the tab-primer relay TP. This circuit includes battery potential from back contacts 1 of each of the tab relays T1–T9, wire 201, break contacts 2 of tab-seize relay TS, wire 202, rectifier 301 and the ground-connected winding of relay TP.

Tab-primer relay TP operates and locks through its make contacts 3 and rectifier 302. Make contacts 1 of relay TP energize wire 203 to close the operate circuit for tab-seize relay TS and its contacts 4 connect conductor MC to wire 204 to prepare an operating circuit for machine-complete relay MC.

Battery potential is continually present on conductor MC of cable CC1 except for a short interval after each machine cycle is completed. Accordingly, battery is connected to relay MC through contacts 4 of relay TP. Also, conductor SRC–6 has battery potential thereon from normally closed cam switches (not shown) in the tape reader. This battery potential is interrupted periodically as will be described hereinafter.

Tab-seize relay TS operates and extends the potential on conductor SCR–6 to the ground-connected winding of read-trip relay RT. This circuit includes break contacts 2 of each of the relays MR, TAB and SON.

Read-trip relay RT operates and locks to the SCR–6 conductor through its make contacts 2. Contacts 2 also connect conductors SCR–6 and OCR together.

Machine-complete relay MC operates over its hereinbefore described circuit and locks through its make contacts 3 independent of the tab-primer relay TP. Contacts 2 on relay MC close the operate circuit for off-normal relay ON.

Off-normal relay ON operates and locks through its make contacts 2 directly to the supply voltage. Relay ON remains operated until the next cessation of power, for example, when a new piece of stock is being inserted in the machine. Contacts 7 of relay ON prepare an operating circuit for read-relay RD of FIG. 4 by applying battery potential through back contacts 4 of relay RC1 to conductor RD and contacts 8 prepare an operating circuit for release-relay RL of FIG. 5 by applying battery potential through make contacts 4 of relay MC to conductor RL.

Read-relay RD and release-relay RL operate over the hereinbefore traced paths and perform reading and release functions.

Relay RD switches the read-out leads (not shown) in cable ROC from register A to register B to prevent any interference with the storage operations. The specific contacts for performing this noted reading-lead switching are not shown but the dotted line portions on cables ROC and CC3 are indicative of such switching.

Figure 5:
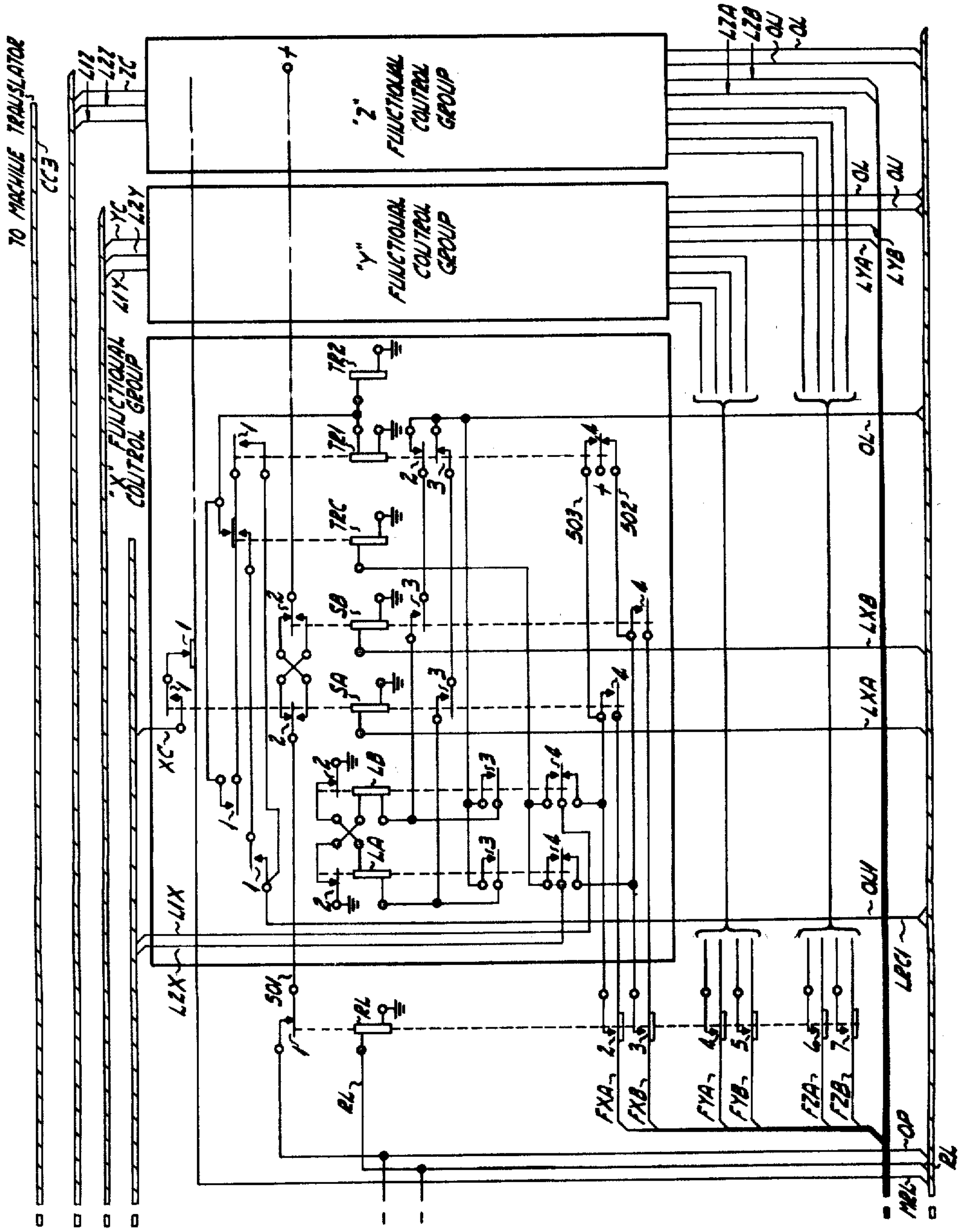
FIG. 5 shows a circuit diagram of the register interrogation and control relays.

Relay RL controls the release of all the hold magnets associated with the "X," "Y," and "Z" function stores, subject to overriding control over such hold magnets by the "X," "Y," and "Z" digit-control-relays of FIG. 5. The operation of this relay in performing its release function will be described hereinafter with respect to the releasing of hold magnets in each of the registers.

*Error release*

Figure 4:
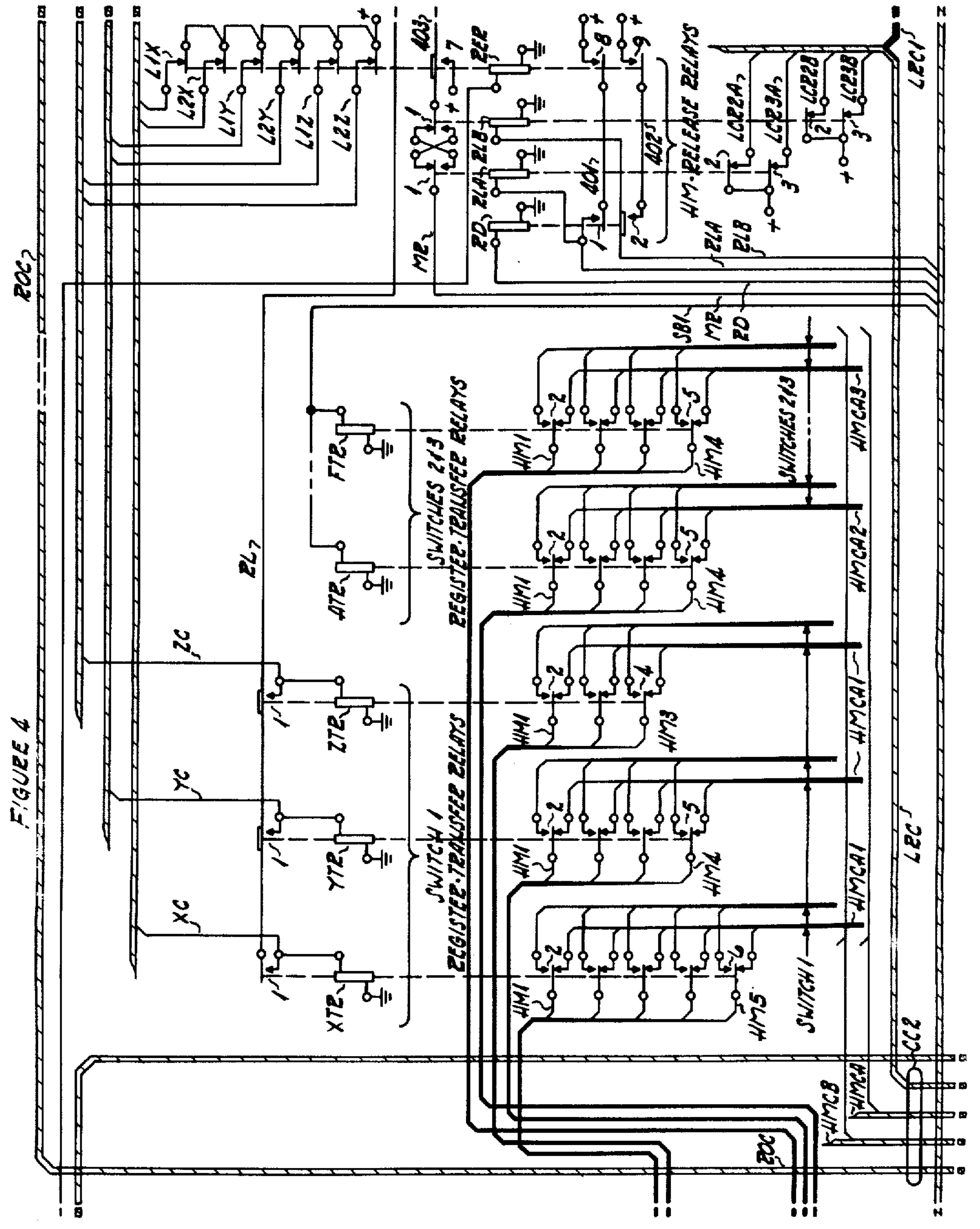
FIG. 4 shows a circuit diagram for transferring the recording leads from one register to another and for controlling release of the registers, as required.

To insure that the equipment is ready to receive the first instruction, or to clear out previously recorded instructions which are erroneous, the operator or attendant at the tape reader depresses a release-error button (not shown) which places a battery potential on conductor RER of cable CC1 extending to the ground-connected winding of release-error-relay RER of FIG. 4.

Relay RER operates. Make contacts 8 of relay RER prepare an operate circuit for register A release-relay RLA by energizing wire 401; make contacts 1 to 6 remove the locking potential from the hold magnets of the "X," "Y," and "Z" function stores in both registers; and contacts 7 energize wire 403 and conductor MRL.

Release-relay RLA operates and at its contacts 1 extends battery potential from conductor 403 to the machine-read-relay MR over conductor MR. Contacts 2 and 3 of relay RLA remove the locking potential from the hold magnets in all the stores of register A of switches 2 and 3. This operation will be described in detail hereinafter.

Machine-read relay MR operates and at its contacts 5 locks to energized conductor MRL. Contacts 1 on relay MR connect conductors RCR and SCR–4 of cable CC1 together to start reading operations; contacts 2 open the operating circuit of relay RT; contacts 3 open the operating circuit of relay TAB; and contacts 4 restore any one of the operated tab-count relays T1 to T9.

On completion of the operation of the relays RER, RLA, and MR, the stores of register A of switches 1 to 3 of FIG. 6 are released and prepared for reception of instructions concerning the various functions. Thereafter, the operator restores the RER push-button and the RER, RLA and MR relays restore in the sequence in which they were operated. At such time, relays TP, TS, RT, MC, ON, RD and RL are operated and the equipment is in condition to receive instructions concerning the positioning of the machine-tool.

*Tape reader operations*

In order to describe more clearly the operation of the controller, a brief description of the tape reader and control conductors will be given.

The tape reader includes a reading shaft (not shown) which makes one complete revolution for each item of stored information. This shaft is in zero position until it is started into rotation by a reader clutch which is energized by battery potential appearing on lead RCR. The clutch is arranged to cause the shaft to rotate one complete cycle and then stop, even though battery is removed from lead RCR during its rotation. When the shaft again reaches the zero position it will stop unless at that instant battery reappears on lead RCR. Thus, if lead RCR always has battery potential thereon when the shaft reaches zero position, it will rotate smoothly and continuously. In the event a failure occurs in the controller, lead RCR will be deenergized and the reader shaft will stop in its next zero position.

When the shaft is in zero position, battery appears on conductors SCR–4 and SCR–6 and when the shaft is rotated to a 35° position, this battery is removed from these leads. Thereafter, the reader shaft rotates to read the tape and causes the operation of decoding relays (not shown) to provide digit signals corresponding to the instructions to be recorded. These signals include a TAB signal and ten SM signals. The ten SM signals correspond respectively to 10 digit values from 0 to 9, as noted.

When the shaft reaches the 325° position, the noted leads SCR–4 and SCR–6 are energized by battery potential again. Responsive to the operation of relays in the controller, this battery is connected to the OCR lead to energize one of the noted eleven signal leads according to their selection by the decoding relays.

In the foregoing description of the Error-Release Operation, the reader shaft was in zero position and battery was on conductor SCR–4. When relay MR operated, while relay RT was operated, conductor SCR–4 was connected to conductor RCR and the reader clutch was energized. Thereafter, relay MR restored but the reader clutch caused the shaft to complete one cycle without further energization of the clutch, as noted.

*Tabulating control*

The tabulating or tab signal appearing on conductor TAB is a signal which performs functions analogous to the tabulating key function on a typewriter. More specifically, this signal causes the equipment in the controller to ready itself in preparation for the next series of digits which makes up a function instruction. Such a tab signal will appear immediately before the transmission of each group of digit information from the tape reader.

*Tabulating signal for "X" function instructions*

Immediately following the error-release operation, the tape-reader shaft begins another revolution to read-out the first digit instruction to be registered. Since the first instruction to be recorded in the crossbar-switch storage is the "X" function instructions, the "X" function tabulating signal will be decoded and transmitted to the controller.

When the tape-recorder shaft reaches its 35° position, battery potential is removed from conductor SCR–6, and the operate and holding circuit of relay RT is opened.

Relay RT restores. Unless proper operations occur in recording the digit instruction, relay RT will not reoperate and the reader shaft will stop in the zero position.

During the rotation of the tape-reader shaft from the 35° position to the 325° position, the tab signal recorded on the tape is read and the tape-reader-coding relays (not shown) are positioned to energize the tabulating lead TAB at the proper time. When the shaft reaches the 325° position, battery potential reappears on conductor SCR–6 and is extended through break contacts 2 of relays SON, TAB, and MR to the ground-connected winding of relay RT through make contacts 1 of relay TS. This potential is also extended to conductor OCR of the tape reader which, through coding-relay contacts causes the tab lead TAB to be energized. Break contacts 3 of re'ay MR. extend the battery potential on conductor TAB to relay TAB.

Relay RT operates before relay TAB and locks through its make contacts 2. These contacts also connect conductor SCR–6 to conductor OCR independently of relays MR and TS.

Relay TAB operates and locks through its make contacts 5 and make contacts 3 of relay TS to battery potential at make contacts 3 of relay ON. Contacts 1 of relay TAB, together with contacts 1 of relay RT, re-establish the circuit between conductors RCR and SCR–4 to control the reader clutch to start the next revolution. Contacts 2 and 3 of relay TAB remove the potential from conductor OCR to indicate receipt of the transmitted information which may permit the decoding relays to restore; contacts 4 energize wire 206 which is connected to the winding of tab-count relay T1 through make contacts 2 of relay TP; make contacts 6 energize wire 205 to maintain relay TP temporarily energized; and contacts 8 energize conductor 217 to cause the rotary magnet RM to home, if necessary, to position 1 through the contacts on bank B1, wiper 208 and the homing contacts HC.

Tab-count relay T1 operates and locks through its make contacts 4, the series make-before-break contacts 5 of relays T2 to T9 and contacts 4 of relay MR to battery potential on conductor 207. Break contacts 1 of relay T1 open the holding circuit of tab-seize relay TS; contacts 3 prepare an operate circuit for relay T2; make contacts 6 prepare an operate circuit for switching-relay SW; make contacts 7 prepare an operate circuit for switch-select relay SS1; and contacts 8 through 12 switch the hold magnet operates leads HM1 to HM5 to the hold magnets of the "X" function store in register A of the first crossbar switch.

Tab-size relay TS restores and at its make contacts 3 opens the locking circuit of relay TAB.

Relay TAB releases and does not reoperate since the battery on conductor TAB was removed by the tape reader decoding relays. Contacts 6 of relay TAB de-energize wire 205 to open the locking circuit of relay TP. At this time, the reader shaft has completed one revolution and started on the next revolution since conductor RCR was re-energized at a time when both relays RT and TAB were operated.

Switch-select relay SS1 operates and, at its contacts 1 to 10, connects the SM leads of cable CC1 to the select magnets S1 to S0 of switch 1 over conductors in cables SMC. Contacts 11 of relay SS1 connect the winding of select-off-normal relay SON to the associated conductor SL.

Relay TP releases and at its break contacts 2 prepares an operate circuit for relay TS through make contacts 1 of relay T1.

Relay SW operates and further prepares the noted hold magnets for operation by connecting the hold magnet leads HM1 to HM5 to contacts 8 to 12 of relay T1.

Relay TS operates and re-connects the OCR conductor to the SCR–6 conductor independently of the make contacts 2 on relay RT. At such a time, the tape-reader shaft is rotating to read the next succeeding digit instruction. Since relay T1 is operated, the controller is prepared to record the five digits of instructions in the "X" function store. At this time, relays ON, MC, TS, RT, SW, T1, SS1, RD and RL are operated.

*"X" function instructions (first digit)*

When the reader shaft rotates through 35°, the potential appearing on conductors SCR–4 and SCR–6 is removed and relay RT restores. However, the tape-reader shaft continues to rotate, as previously described, and reads the next instruction which is the first digit of the "X" function. The decoding relays in the reader establish a connection between the OCR lead and one of the select magnet leads SM1 to SM0. If the digit value of the "X" function instruction is a "1," the OCR lead is connected to lead SM1; if the digit instruction is a "2," the connection is made to SM2, and so on. When the reader shaft reaches 325°, battery is applied to the SCR–4 and SCR–6 conductors, as noted. The battery on SCR–6 energizes the RT relay and the OCR conductor to energize the selected SM lead.

The read-trip relay RT operates as hereinbefore described and locks operated to the SCR–6 lead.

The first switch-select relay SS1 is operated as hereinbefore noted and through contacts thereon extends the battery potential appearing on the selected one of the SM leads to the corresponding select magnet in switch 1. This path includes conductors in cables SM, SMC and SMC1. Assuming the first digit in the "X" function instructions is a "1," select magnet wire SM1 is energized and energizes select magnet S1 of switch 1 of FIG. 6.

Select magnet S1 operates and its operating potential is extended through its off-normal contacts to the select-magnet-lock conductor SL in cable SMC1. This potential is extended through make contacts 11 of relay SS1 to the ground-connected winding of the select-off-normal relay SON of FIG. 2. At the same time, the select rod (not shown) of switch S1 is operated.

The select-off-normal relay SON operates and locks through its make contacts 4 to wire 207 which has battery potential thereon from make contacts 4 of relay ON. Break contacts 2 and 3 open the connection between conductors SCR–6 and OCR, thereby opening the operate circuit of the select magnets. The decoding relays may then be restored in preparation for reading the next digit instruction. Select magnet S1 does not restore since it is also locked to the battery on wire 207 over conductor SL. Make contacts 5 and 6 of relay SON prepare an operate circuit for rotary magnet RM and an operate circuit for hold magnet H1A. The operation of relays RT and SON at the same time, re-energizes the RCR conductor causing the reader shaft to start its next revolution.

When make contacts 5 of relay SON close, battery potential on wire 210 is extended through break contacts 7 of relay TAB to the ground-connected winding of the rotary magnet RM. This magnet is of the type that advances its brushes on the termination of each driving pulse. Accordingly, brushes 208 and 209 of rotary magnet RM remain positioned on bank contacts 1.

Hold-magnet H1A of switch 1 operates from battery potential on wire 210 which is the winding of hold-magnet-test relay HMT, contacts 6 of relay SON, contacts 1 of bank B2 of rotary magnet RM, hold magnet lead HM1, make contacts 1 of relay SW, make contacts 8 of relay T1, break contacts 2 of register-transfer relay XTR and the corresponding conductor in cable HMCA.

Relay HMT operates in series with magnet H1A and opens the locking circuit of relay SON and select magnet S1.

Relay SON restores, opens the operate circuit of hold-magnet H1A and removes battery from the rotary magnet winding. Magnet H1A remains operated as described hereinafter.

Select magnet S1 restores since its locking circuit is in parallel with relay SON. As is well-known, the cross-points operated by the coincident operation of a select and hold magnet remain operated after the select magnet restores. Hold magnet H1A locks through its off-normal contacts to conductor FXA in cables LRC1 and LRC which has battery potential thereon from break contacts 1 of relay RER, break contacts 4 of relay LB and make contacts 2 of relay RL.

Relay HMT restores after relay SON releases since its operate circuit is opened by contacts 6 of relay SON.

Rotary magnet RM operates when battery is removed from its windings and causes its brushes to advance to position No. 2 in preparation for operating the second hold magnet in register A of switch 1 responsive to the receipt of the next digit instruction. At this time, relays ON, MC, TS, RT, SW, T1, SS1, RD and RL are operated and the digit "1" instruction is registered in the crossbar storage. The controller is now prepared to receive the second digit of the "X" function instructions.

*"X" function instructions (second digit)*

When the tape reader reads the next digit and energizes a selected one of the select magnet leads SM1 to SM0, the hereinbefore described operations take place. Assuming the second digit to be a "2," select magnet lead SM2 is energized and the select magnet S2 is operated. Thereafter, relay SON operates, and operates the second hold magnet H2A which locks to battery supplied from the preceding hold magnet. The hold-magnet-test relay HMT then operates and causes the restoration of the operated select magnet and relay SON. Thereafter, rotary magnet RM advances its brushes to bank contacts 3 and relay HMT releases. The circuit is now prepared to receive the third digit and mark it in the crossbar storage.

*"X" function instructions (third digit)*

When the third digit of the "X" function instructions is read and recorded in a manner similar to that hereinbefore described, the rotary magnet RM advances its brushes one additional step. This prepares the circuit for receipt of the fourth digit.

If, as previously noted, the remaining digits of the "X" function instructions were to be registered on an auxiliary switch, an additional bank could be provided on the rotary magnet to cause the restoration of the first switch-select relay SS1, and the operation of an auxiliary switch-select relay. This would then result in the fourth and remaining digits of the "X" function instructions being recorded in the auxiliary switch. No difficulty would be encountered in operating the proper hold magnet since internal wiring between transfer relay XTR and the concerned switch would handle such deviation. However, this particular arrangement is not disclosed herein and relay SS1 remains operated in order that the remaining fourth and fifth digits of the "X" function instructions be recorded in switch 1.

*"X" function instructions (fourth digit)*

When the next digit is read and recorded, the rotary magnet RM advances another step and the controller is in condition to receive the next digit.

*"X" function instructions (last digit)*

When the fifth and last digit of the "X" function instruction is read, the fifth hold magnet H5A is operated and locked. At such time, the rotary magnet bushes advance the bank position 6. The controller is now ready for receipt of a tab signal which conditions the controller for recording the "Y" function instructions.

*"X" register transfer*

Responsive to the operation and locking of the fifth and last hold magnet of the "X" function store, battery is extended through its off-normal contacts 1 to conductor LXA of cable LRC1. This battery potential is extended over cable LRC to the ground-connected winding of the relay SA of the "X" function control group of FIG. 5, operating it.

*Tabulating signal for "Y" function instructions*

Since the programmed tape contained five digits for the "X" function instructions, the next succeeding information on the tape is a tabulating signal which functions to condition the controller to receive and store the digits of the "Y" function instructions. Assuming the last digit of the "X" function instruction to be properly recorded, relays RT and SON were operated at the same time and caused the reader clutch to operate and the reader shaft to continue rotating. At this time, relays ON, MC, TS, RT, T1, SS1, RD, RL and SA are operated. Additionally, the hold magnets H1A to H5A of register A of switch 1 are operated and the actuated crossbar switch crosspoints are indicative of the stored digits of the "X" function instructions.

When the tape-reader shaft reaches its 35° position, battery potential is removed from conductor SCR–6 and relay RT restores as hereinbefore described. Thereafter, the reader decodes the next item of information on the tape and when the tape-reader shaft reaches the 325° position, a tabulating signal appears on lead TAB and battery potential appears on conductor SCR–6.

Relays RT and TAB operate sequentially as hereinbefore described. Make contacts 4 of relay TAB operate tab-count relay T2, which upon operating, causes relay TS to restore. Tab-count relay T1 remains temporarily operated from battery potential on wire 205 through make contacts 6 of relay TAB. Contacts 8 of relay TAB extend battery potential over conductor 217 to all of the bank contacts of the first bank of rotary magnet RM except the first contact. This potential is extended through bank terminal 7, through brush 208 and homing contacts HC to the ground-connected winding of magnet RM. Magnet RM thereupon operates its brushes step-by-step across the bank until brush 208 reaches the home position on contact 1. At such a time, rotary magnet RM is de-energized and brush 209 is positioned on the first hold magnet wire HM1 in preparation for receiving the first digit of the "Y" function instructions.

Tab-seize relay TS restores and opens the locking circuit of relay TAB causing it to restore. Responsive to the restoration of relay TAB, relay T1 restores.

Relay SW restores responsive to the operation of tab-count relay T2 and transfers the hold-magnet leads HM1 to HM5 from the contacts associated with tab-count relay T1 to contacts 8 to 11 associated with tab-count relay T2. Since there are only four digits in the "Y" function instructions, only hold magnet wires HM1 to HM4 are extended through contacts on relay T2. Switch-select relay SS1 is held operated to maintain the SM leads connected to switch 1.

The controller is now prepared to receive the first digit of the "Y" function instruction. Relays RT and TAB were operated concurrently and the reader clutch was energized to cause the reading of the succeeding tape information.

*"Y" function instructions*

The four digits of the "Y" function instructions are stored on hold magnets H6A to H9A of register A of switch 1 in the manner described for the storing of the "X" function information in the "X" function store.

Responsive to the operation of the last hold magnet H9A of the "Y" function store, positive potential appears on conductor LYA which is extended to the SA relay (not shown) in the "Y" function control group of FIG. 5. Relay SA operates.

The controller is now conditioned to receive the tabulating signal for the "Z" function instructions in preparation for the subsequent storing of the next digits.

*Tabulating signal for "Z" function instructions*

Responsive to the receipt of the third tabulating signal, the hereinbefore described operations take place and cause the tab-count relay T3 to operate and the preceding relay T2 to restore to connect the hold-magnet leads to the "Z" function store. At the same time, switching relay SW will operate and the rotary magnet will be homed to complete the operate circuit for the hold magnets of the "Z" function store. Switch-select relay SS1 will remain operated since the select magnets for controlling the "Z" function store are located in the first switch.

The controller is now prepared to receive the three digits of the "Z" function instructions.

*"Z" function instructions*

The three digits of the "Z" function instructions are stored on hold magnets H10A to H12A of switch 1 in a manner similar to that described for the storing of the "X" and "Y" function instructions.

Responsive to the operation of hold magnet H12A, the corresponding relay SA of the "Z" function control group of FIG. 5 operates. The controller then conditions itself for the receipt of the tabulating signal and digits of the next function instructions.

*Tabulating signal for the "A" function instructions*

The operation of the controller in responding to the tabulating signal for the fourth or "A" function instruction is similar to that previously described for the "X," "Y" and "Z" function tabulating signals. However, tab-count relay T4 will be operated and relay T3 will be restored, thereby operating switch-select relay SS2 and restoring relay SS1. This causes the transfer of the select magnet leads SM1 to SM0 from the select magnets of the first switch to the select magnets of the second switch. At the same time, the brushes of the rotary magnet RM are positioned on bank contacts 1 in readiness for recording the first digit of the fourth function instruction. Switching-relay SW is restored to connect the hold-magnet leads HM1 to HM4 to contacts 8 to 11 of relay T4.

*"A" function instructions*

The four digits of the "A" function instructions will be recorded in switch 2 on hold magnets H1A to H4A therein in the same manner as described for the storing of digit instructions in switch 1. However, only one set of off-normal contacts are provided on the hold magnets. These contacts function to lock all operated hold magnets in parallel to locking conductor LCR2A in cable LCR2 extending to battery at break contacts 2 of relay RLA of FIG. 4. Thus, operation of release-relay RLA will result in restoration of all operated hold magnets in register A of switches 2 and 3 whereas operation of relay RLB will remove the locking potential from the hold magnets of register B of switches 2 and 3.

*Tabulating signals and digit recording for the remaining functions*

The tabulating signals and succeeding digits for each of the remaining "B" to "F" function instructions will be recorded in register A on corresponding stores in switches 2 and 3. This operation is similar to that hereinbefore described, with the contacts on the tab-count relays T4 through T9 controlling the selection of the switches and relay RLA controlling the locking circuits for the hold magnets. Relay SW will operate and restore as necessary to connect the hold-magnet leads to the proper tab-count relay.

Since one complete set of instructions is recorded in register A of the three switches of the crossbar storage, the controller must be conditioned to receive and store the next set of instructions in register B. At the same time, the information now stored in register A must be read-out and control exercised over the machine tool in accordance therewith. This conditioning of the controller is accomplished by the appearance of an "end-of-line" signal from the tape reader and decoder which momentarily removes battery potential from the machine-complete conductor MC. The operation of the controller in responding to such signal and in conditioning itself to receive the next set of instructions will now be described.

*End of instructions*

On completion of the recording of one complete set of instructions for one operation of the machine, relays ON, MC, TS, RT, T9, SS3, RD, RL, and SA of the "X," "Y" and "Z" function control relays are operated. Also, all of the hold magnets in register A of switches 1 to 3 are operated. At such time, the battery potential appearing on conductor SCR–6 is removed, permitting read-trip relay RT to restore in the manner hereinbefore described. When the tape reads the end-of-line signal, battery potential is removed from conductor MC of cable CC1.

Machine-complete relay MC restores and at its break contacts 1 prepares an operate circuit for relay RC1; and at its contacts 4 opens the operate circuit of relay RL and completes an operate circuit for register B release-relay RLB. Also, battery potential is extended over conductor OP to the "X," "Y" and "Z" function transfer-relays XTR, YTR and ZTR.

Relay RLB operates, and at its break contacts 2 and 3, removes battery potential from the locking conductors of the hold magnets in register B of switches 2 and 3. Contacts 1 of relay RLB connect wire 403 to conductor MR in preparation for the operation of the machine-read relay MR when release relay RL restores. Responsive to the removal of locking potential from the hold magnets from switches 2 and 3, all operated hold magnets in register B of such switches restore in readiness for the receipt of digit information for the "A" to "F" function instructions.

Relay RL restores and at its break contacts 1 extends battery potential from contacts 2 on relays SA and SB (not shown) in the "Z" function control group, through similar contacts on relays SA and SB in the "X" and "Y" function control group to wire 501, over wire 403 to conductor MR as previously noted. Contacts 2 to 7 of relay RL in conjunction with contacts on relays LA, SA and TR1 remove the locking potential from the hold magnets of the "X," "Y" and "Z" function stores of register B to release the hold magnets therein in preparation for receiving new instructions. It will be noted that the release of relay RL serves a function similar to that of RER in removing battery from all hold magnets in the "X," "Y" and "Z" function stores. The locking potential on conductors FXA, FYA and FZA is uneffected by the release of relay RL since contacts 4 of relay SA provide an alternate path. Accordingly, the hold magnets in the "X," "Y" and "Z" stores of register A are maintained operated.

Responsive to above described restoration of relay RL and the hereinbefore described operation of relay RLB, the locking potential is removed from all of the hold magnets in register B of switches 1 to 3. At this time, register B is in condition to receive the digits comprising the next set of instructions.

Relays XTR, YTR and ZTR operate from the battery potential on conductor OP which is extended through make contacts 1 of the operated SA relay in each of the "X," "Y" and "Z" function groups shown in FIG. 5. Each of these relays lock to the potential on conductor RL independently of the noted control groups, as will be described later. Contacts 2 to 6 of relay XTR, contacts 2 to 5 of relay YTR and contacts 2 to 4 of relay ZTR transfer the hold-magnet wires of their corresponding stores from the register A magnets to the register B magnets in preparation for storing the corresponding digits of the forthcoming set of instructions.

Relay RC1 operates from the battery potential apearing on wire 211. Relay RC2 is short-circuited at this time and does not operate. Contacts 3 of relay RC1 extend battery potential to wire OL and contacts 4 transfer battery potential from conductor RD to conductor SB1 extending to relay ATR to FTR.

Relays LA, TRC, TR1 and TR2 operate to release any operated hold magnet in the "X," "Y" and "Z" stores of register B. Each operated relay SB releases when the corresponding hold magnets are released. Relays LA and TRC restore when battery potential is removed from conductor OL. The detailed operation of the 'X," "Y" and "Z' function control groups will be described hereinafter.

Relays ATR to FTR operate from the battery potential appearing on conductor SB1. Contacts 2 to 5 of each of these relays transfer the hold magnet operate wires of the hold magnets in their respective groups from register A to register B in order to condition register B for storage of the "A" to "F" function digits instructions. The noted operation of the three relays XTR, YTR and ZTR, together with the operation of the six relays ATR to FTR complete the transfer of the hold magnet leads of the hold magnets in register A to the hold magnets in register B.

Read-relay RD restores and by contacts not shown, transfers the reading conductors of the portion of the contact bank associated with register B to the portion of the contact bank associated with the register A. At such time, other controls not shown, cause signals indicative of the cross-points operated in register A, to be transmitted to the translator over conductors in cable CC3 and ultimately to the machine to control the operation of the machine tool. The machine then begins the operations in accordance with the instructions recorded in the register A.

Relay MR operates from the battery potential appearing on conductor MR from conductor 501 of FIG. 5 and locks to the same potential appearing on conductor MRL. Contacts 1 on relay MR, together with contacts 1 on relay RT, energize the reader clutch to cause the reader shaft to continue to rotate. Contacts 3 of relay MR open the operate circuit of relay TAB and contacts 4 remove the locking potential from the winding of tab-count relay T9.

Tab-count relay T9 restores and at its contacts 1 opens the operate and holding circuits of relay TS. At the same time, its contacts 7 open the operate circuit of switch-select relay SS3 and its contacts 8 through 11 disconnect the hold magnet operate leads associated with the bank of rotary magnet RM. At this time, none of the tab-count relays T1 to T9, nor any or of the switch-select relays SS1 to SS3, are operated.

Tab-seize relay TS restores and at its break contacts 2 establishes an operating circuit for relay TP as described when the power was first turned on.

Relay TP operates and prepares an operate circuit for relay TS. Relay TS re-operates and at its contacts 1 closes an operate circuit for relay RT as previously noted. At this time, the decoding relays in the tape reader and decoder reapplies battery potential to the conductor MC which, through contacts 4 of relay TP, is now connected to the ground-connected winding of relay MC.

Relay MC operates and locks through its contacts 3 to conductor MC. Contacts 4 of relay MC open the operate circuit of the transfer relays XTR, YTR and ZTR and at the same time extend battery potential over conductor RL to relay RL. Relays XTR, YTR and ZTR lock to this potential. Contacts 4 of relay MC also remove battery potential from conductor RLB, permitting it to restore and re-energize the locking conductors LCR2B and LCR3B.

Relay RC2 operates in series with the lower winding of relay RC1 to the battery potential on conductor 211. Contacts 2 of relay RC2 remove battery potential from conductor OL.

Release-relay RL reoperates and, at its break contacts 1, opens the connection between conductor 501 and the operating and locking circuits of relay MR.

Relay MR restores and recloses a locking circuit to the tab-count relays and closes the operate circuit of relay TAB in preparation for receiving the next digit. At this time, relays ON, MC, RC1, RC2, TS, RT, TP, XTR, YTR, ZTR, ATR to FTR, RL and SA, TR1 and TR2 of the "X," "Y" and "Z" control groups are operated. The controller is now in condition to receive and record the second set of instructions in register B.

*Second set of instructions*

The controller responds to the tabulating and digits signals and stores the instructions for each of the nine functions in the manner hereinbefore described. Assuming that new instructions are received for each function, these digit instructions are recorded on the hold magnets in register B. Responsive to the operation of the last relay of each of the "X," "Y" and "Z" function stores in register B in switch 1, battery potential appeared on the corresponding conductors LXB, LYB and LZB extending to the "X," "Y" and "Z" function control groups of FIG. 5, operating relays SB therein. At such time, relays SA and SB in each of the control groups are operated.

Following the registration of the last digit of the "F" function instructions, the battery potential on conductor MC is interrupted.

*End of second set of instructions*

Relay MC releases responsive to the momentary removal of battery potential from conductor MC. Contacts 1 of relay MC energize the upper winding of relay RC2 and also the upper winding of relay RC1; and its contacts 4 transfer battery potential from conductor RL to conductors OP and RLA.

Release relay RL restores and, at its contacts 1, connects wire 501 to wire 403. Since both an SA and an SB relay are operated in each of the "X," "Y" and "Z" function control groups, no battery potential appears on wire MR and relay MR is not energized. Contacts 2 through 7 of relay RL are in parallel with make contacts 4 on relays SA and SB in each of the control groups and the hold magnets do not restore at this time since battery potential remains on the locking conductors.

Relay RC1 restores since its two windings are differentially connected and the resulting flux is zero. Relay RC2 remains operated from the battery potential on conductor 211 extended through break contacts 1 of relay MC. Contacts 3 of relay RC1 extend battery potential through contacts 2 of relay RC2 to conductor OL and its contacts 4 transfer battery potential from conductor SB1 to conductor RD.

Relays XTR, YTR and ZTR restore since their locking circuit is open by the removal of battery potential from conductor RL and their operate circuit is open at contacts 1 of relays SA and SB of the corresponding control groups. Contacts on relays XTR, YTR and ZTR transfer the hold magnet wires of the respective stores in register B to the corresponding hold magnets in register A.

Release-relay RLA operates and, at its break contacts 2 and 3, removes the locking potential from the hold magnets of each of the stores in register A of switches 2 and 3. The hold magnets in register A of switches 2 and 3 restore and are in condition to receive the next set of instructions corresponding to functions "A" through "F."

Register-transfer relays ATR to FTR restore and transfer the hold magnet leads from the hold magnets in the register B stores in switches 2 and 3 to the magnets in register A. At present, all of the hold magnet leads of all of the stores of switches 1 to 3 are now connected to the hold magnets of register A in preparation for receiving the next set of instructions.

Relays LB and TRC operate and relays TR1 and TR2 restore to remove the locking potential from the hold magnets in register A of switch 1. Relays LB and TRC restore when battery potential is removed from conductor OL. As noted, this operation will be described in detail later.

All of the hold magnets in each of the "X," "Y" and "Z" function stores in register A restore since, as previously noted, each relay succeeding the first is maintained operated by the preceding relay. When the last hold magnet of each store releases, battery potential is removed from the corresponding conductors LXA, LYA and LZA, releasing relays SA. An operate circuit is now closed for relay MR.

Machine-read relay MR operates and restores any operated tab-count relay T1 to T9. At the same time, the reader clutch is engaged and the first signal of the next succeeding set of instructions is read by the tape reader. When relay T9 restores, the operate circuit of relay TS is opened, restoring it. The restoration of relay TS causes relay TP to operate as hereinbefore described and extend battery potential, re-appearing on conductor MC, to relay MC.

Machine-control relay MC operates and, at its contacts 1, removes the holding potential from relay RC2 and contacts 4 of relay MC de-energize conductor RLA and energize conductor RL.

Release-relay RL operates and recloses the locking circuit for the first hold magnets of the "X," "Y" and "Z" stores in register A in preparation for the recording of digit information therein. At the same time, contacts 1 of relay RL open the operate and locking circuit of relay MR.

Relay RC2 restores and removes the potential from conductor OL. Relay MR restores and recloses a locking circuit to the tab-count relays T1 and T9. The controller is now prepared to receive the next set of instructions and to record them in register A.

As long as a complete new set of instructions is sent to the "X," "Y" and "Z" function stores, the controller and crossbar switches will operate as hereinbefore described. However, as pointed out in the features of the invention, the speed of recording instructions may be increased by omitting the recording of each "X," "Y" and "Z" function instruction which is identical to the corresponding instructions last recorded.

*"X" function control group operation*

The hereinbefore noted sequence of operation of the relays of the "X," "Y" and "Z" function control-groups will now be described in detail. This description will relate to the "X" function group only since similar operations occur in the "Y" and "Z" function control-groups.

Responsive to the operation of the first hold magnet in the "X" function store in register A, off-normal contacts thereon lock such hold magnet operated to the battery potential appearing on conductor FXA from contacts 1 of relay RER. This potential is extended over conductors L1X, through break contacts 4 of relay LB, and make contacts 2 of operated release-relay RL. Accordingly, the first hold magnet in the "X" function store locks operated.

Responsive to the operation of the remaining hold magnets in the "X" function store, battery potential is extended through the off-normal contacts on the last hold magnet in such store to conductor LXA extending to relay SA. This potential will appear only if all the preceding relays have operated since the locking circuit of each relay after the first is controlled by contacts on the preceding relay.

Relay SA operates and, at its make contacts 1, connects conductor XC, extending to the ground-connected winding of relay XTR, to the OP conductor which is not energized at this time. Contacts 3 of relay SA prepare an operate circuit for relay LA and contacts 4 provide a shunt path around contacts 2 of relay RL.

When the battery potential is removed from conductor MC, as previously described, and relay MC restores, battery potential appears on conductors OP and OL. At the same time, battery potential is removed from conductor RL.

Relay XTR operates from the battery potential appearing on conductor OP and transfers the hold magnet leads to the magnets of register B.

Relay RL releases and, at its contacts 3, opens the locking circuit of the first hold magnet in the "X" function store in register B. The locking circuit for the magnet in register A is maintained complete by contacts 4 of relay SA, which shunt contacts 2 of relay RL.

The battery potential on conductor OL is extended through break contacts 3 of relay TR1 and make contacts 3 of operated relay SA to the ground-connected winding of relay LA.

Relay LA operates and locks to wire OL through its make contacts 3. Contacts 4 of relay LA complete an operating circuit for relay TRC.

Relay TRC operates and completes an operate circuit for relays TR1 and TR2 through break contacts 1 of relay LB, make contacts of relay TRC and make contacts 1 of relay LA to the normally energized conductor ON1.

Relays TR1 and TR2 operate. Contacts 4 of relay TR1 transfer locking potential from conductor 502 to conductor 503.

When machine-complete relay MC reoperates to start the next set of instructions, potential re-appears on conductor RL and disappears from conductors OP and OL.

Relay RL reoperates and the register-switch transfer relay XTR locks to such operating potential.

Relay LA restores since its locking circuit is opened by the removal of battery from conductor OL. Contacts 4 of relay LA transfer battery potential from relay TRC to wire 502.

Relay TRC restores and transfers the holding circuit for relays TR1 and TR2 to normally energized conductor ON1 independently of contacts on relays LA and LB. Accordingly, these relays remain operated throughout the next registration of the complete set of instructions. Since the hold magnets in register A are operated, relay SA is locked to battery potential on wire LXA.

Assuming the next registration of the digits of the "X" function instructions to be different than those previously stored, the hold magnets of the "X" function digit store in register B are operated in accordance with the desired digits. Responsive to the operation of the last hold magnet of the "X" function store in register B, conductor LXB is energized and relay SB in the "X" function control-group operates. Relays SA and SB are now both operated.

On completion of the last set of instructions, relay MC restores, energizes the OL and OP conductors and removes battery potential from conductor RL. At such time, relay XTR releases since its holding circuit is opened by the removal of battery potential from conductor RL and its operate circuit is opened at break contacts 1 of relay SB. Battery potential on conductor OL is extended through make contacts 2 of operated relay TR1 to the ground-connected winding of relay LB through make contacts 3 on relay SB.

Relay LB operates and locks to conductor OL through contacts 3. Break contacts 1 on relay LB open the operate path of relays TR1 and TR2; its break contacts 2 open the operate circuit of relay LA; and its contact 4 energize relay TRC and remove battery potential from conductor FXA supplied by the contacts on relay RER. At such time, relay TR1 is operated and make contacts 4 thereon maintain locking potential on conductor FXA.

Relay TRC operates and opens the operate circuit of relays TR1 and TR2.

Relays TR1 and TR2 restore. Contacts 4 of relay TR1 remove battery potential from conductor FXA, thereby opening the locking circuit for the hold magnets in the "X" function store in register A. At the same time, contacts 2 and 3 of relay TR1 transfer conductor OL from the winding of relay LB to the winding of relay LA. Relay LA will not operate at this time since its operate circuit is open at break contacts 2 of relay LB which is locked to conductor OL. The hold magnets in the register A digit store for the "X" function release and remove potential from conductor LXA.

Relay SA restores and contacts 4 thereon prevent battery potential from contacts on relay RER from reappearing on the FXA locking lead.

At the proper time, relay MC reoperates, removes battery potential from conductors OP and OL and re-energizes conductor RL. The removal of battery potential from conductor OL de-energizes relay LB permitting it to restore. The restoration of relay LB causes relay TRC to restore and open the operate circuit of relays TR1 and TR2 to prevent their re-operation. At the same time, break contacts 4 of relay LB re-apply battery potential to the locking conductor FXA in preparation for the locking of the first hold magnet of the "X" function digit store in register A when the corresponding digit information is transferred thereto. At this time, relay SB is the only relay operated in the "X" function control group.

Assuming the next set of digits to be stored in the

"X" function store to be different from those just recorded in register B store, the hold magnets in register A operate and cause the operation of relay SA. Relays SA and SB are now operated. When the conductor OL is subsequently energized, relay LA operates and the hereinbefore described operations will take place in removing the locking potential from the hold magnets in the "X" function store in register B. The release of such hold magnets results in the consequent restoration of relay SB and the energization of conductor XC through break contacts 1 of relay SB and make contacts 1 of relay SA. Relay XTR operates and transfers the hold magnet leads to the B register in preparation for storing the next items of digit information therein. Relay XTR locks to conductor RL when relay MC re-operates. Relays TR1 and TR2 are operated and locked to conductor ON1 as previously described.

Assuming the next set of instructions to be transmitted to the "X" function store in register B to be identical to that presently recorded in register A, the "X" function control-group relays must be conditioned to preclude the release of the register A store, yet prevent the transfer of the reading leads from the register A portion of the switch bank. This is accomplished as follows:

When the digits of the "X" function instructions are the same as those previously recorded, the tab signal for the "Y" function instruction immediately follows the tab signal for the "X" function instruction without any digit recording. Accordingly, none of the hold magnets in the "X" function store in register B are operated and no locking potential appears on conductor LXB.

After the digits of the other function instructions are stored and conductor OL is energized as previously described, the potential thereon is ineffective since relays TR1 and TR2 are operated and the operating circuit for relay LB is open at contacts 3 of relay SB. Relay XTR does not release at this time since its operate circuit is maintained closed from the battery potential on conductor OP extending to conductor XC. Accordingly, none of the hold magnet leads and none of the read leads associated with the "X" function store in register A are transferred, thereby maintaining the corresponding store in register B in condition for receiving the next set of instructions if they are different.

If the digits of the "X" function instructions are identical for the second time, the same operations recur and no change is effected. However, at any time the information is different, it will be stored in register B and the corresponding relay SB will operate. Under such circumstances the appearance of battery potential on conductor OL will cause the restoration of the hold magnets associated with the register A store as previously described.

The operation of the "Y" and "Z" function control-groups is similar to that just described. Since each of these groups have separate leads similar to leads LXA and LXB associated therewith, the control groups may serve to store the "X" function instructions in register A while the "Y" function instruction is stored in register B. Similarly, the digit instruction for the "Z" function store may be recorded in register A or B. Under these circumstances, the crossbar switches are controlled to retain the information received therein unless the corresponding set of instructions next received is different from that previously stored. This circuit arrangement simply and reliably carries out the hereinbefore described features.

While the unique control arrangement for the "X," "Y" and "Z" function instructions have been described and disclosed, similar arrangements could be provided for each of the remaining six functions of the "A" to "F" functions. A safety feature resides in the above-described arrangement in that in the event one of the hold magnets associated with a particular store is defective and fails to operate, the corresponding store in the other register will retain its information. This insures that the machine does not receive a "X," "Y" or "Z" open-condition instruction which would result in injury to the machine by the tool engaging stock in the machine.

If for any reason, the information stored in the crossbar switches is to be cleared out in preparation for receiving new instructions, the release-error button is depressed to operate the release-error relay RER as previously described. This causes the removal of locking potential from all of the hold-magnet locking conductors of the register last used, thereby returning them to normal unoperated condition.

While the principles of the invention have been described above in connection with specific apparatus, it is to be clearly understood that this description is made only by way of example and not as a limitation of the scope of the invention.

I claim:

1. A controller for use in a programmed machine-tool system for transmitting successive sets of multi-element instructions, made up of sets of multi-digit numbers, from a programming device to a machine tool for controlling operation of the machine tool in accordance with said instructions, said controller comprising:

registering apparatus including a crossbar switch having horizontal and vertical intersecting rows, said horizontal rows corresponding respectively to digit values and said vertical rows corresponding respectively to positions of said digits in said sets of numbers;

control means associated with said registering apparatus for temporarily storing said sets of instructions in said registering apparatus and for transferring the stored instructions to said machine tool;

operating means associated with said control means for controlling said horizontal and vertical rows to record an indication of the digits in said sets of multi-digit numbers;

release means associated with said control means for cancelling said recordation of digit indications responsive to the said transfer of stored information to said machine tool;

first and second registers in said registering apparatus for storing respective sets of instructions;

sequencing means in said control means for controlling the said registers alternately and sequentially to store one set of instructions in one register and to transfer stored instructions in the other register to a machine tool while maintaining the instructions in the said other register until new and different instructions are stored in said one register; and means for preventing the recordation of digit indications from the sets of instructions in places corresponding to the locations of certain multi-digit numbers which have been omitted from received instructions.

2. In a controller as set forth in claim 1;

means for altering the said sequencing means to control the said operating and directing means to cause the recordation of digit indications of the next appearance of any said omitted multi-digit numbers in the corresponding one of the last-said stores.

3. A controller as set forth in claim 1, wherein;

the said first and second registers comprise first and second sets of groups of crossbar switch stores and wherein the said sequencing and directing means causes the successive recordations of digit indications of the multi-digit numbers of two successive sets of instructions in corresponding stores in the said first and second sets of stores;

the said release means cancelling the said recordation of digit indications in the first set of stores responsive to the recordation of digit indications in the second set of stores.

(References on following page)

References Cited by the Examiner

UNITED STATES PATENTS

| | | | |
|---|---|---|---|
| 2,103,297 | 12/37 | Nelson | 340—154 |
| 2,302,535 | 11/42 | Durbin | 340—346 |
| 2,348,680 | 5/44 | Hanson et al. | 340—147 |
| 2,577,067 | 12/51 | Arthur | 179—27.54 |
| 2,636,672 | 4/53 | Hamilton et al. | 340—172.5 |
| 2,875,390 | 2/59 | Tripp | 340—147 |
| 2,905,930 | 9/59 | Golden | 340—172.5 |
| 2,930,513 | 9/59 | Phelps et al. | 178—17.5 |

NEIL C. READ, *Primary Examiner.*

ROBERT H. ROSE, EVERRETT R. REYNOLDS, *Examiners.*